(12) United States Patent
Gong et al.

(10) Patent No.: US 7,973,514 B2
(45) Date of Patent: Jul. 5, 2011

(54) BATTERY CELL BALANCING SYSTEMS USING CURRENT REGULATORS

(75) Inventors: Xiaofei Gong, Shanghai (CN); Anquan Xiao, Shanghai (CN)

(73) Assignee: O2Micro, Inc., Santa Clara, CA (US)

( * ) Notice: Subject to any disclaimer, the term of this patent is extended or adjusted under 35 U.S.C. 154(b) by 223 days.

(21) Appl. No.: 12/005,507

(22) Filed: Dec. 27, 2007

(65) Prior Publication Data

US 2009/0091294 A1    Apr. 9, 2009

Related U.S. Application Data

(60) Provisional application No. 60/998,104, filed on Oct. 9, 2007.

(51) Int. Cl.
*H02J 7/00* (2006.01)
(52) U.S. Cl. ....................................................... 320/122
(58) Field of Classification Search .................. 320/116, 320/118–120, 122; 361/54; 307/52–54, 307/77
See application file for complete search history.

(56) References Cited

U.S. PATENT DOCUMENTS

| | | | | |
|---|---|---|---|---|
| 5,754,027 A | * | 5/1998 | Oglesbee et al. | 320/122 |
| 6,285,161 B1 | * | 9/2001 | Popescu | 320/118 |
| 7,466,104 B2 | * | 12/2008 | Wang et al. | 320/118 |
| 7,471,064 B2 | * | 12/2008 | Sobue et al. | 320/116 |
| 2005/0112420 A1 | * | 5/2005 | Lai et al. | 429/13 |
| 2008/0088277 A1 | * | 4/2008 | Wang et al. | 320/119 |

FOREIGN PATENT DOCUMENTS

| CN | 1221880 C | 6/2003 |
|---|---|---|
| CN | 2790010 Y | 6/2006 |

OTHER PUBLICATIONS

English Translation of Office Action from China Patent office for Application No. 2007101631129.

\* cited by examiner

*Primary Examiner* — Edward Tso
*Assistant Examiner* — Ramy Ramadan (57) ABSTRACT

According to one embodiment of the invention, there is provided a cell balancing circuit used for balancing a cell. The cell balancing circuit includes a bypass path coupled to the cell, a current regulator coupled to the bypass path, and a bleeding control switch. The current regulator is operable for producing a current and for controlling a conductance status of the bypass path. The bleeding control switch conducts the bypass path in response to the current produced by the current regulator.

22 Claims, 8 Drawing Sheets

BATTERY CELL BALANCING SYSTEMS USING CURRENT REGULATORS

CROSS-REFERENCE TO RELATED APPLICATIONS

This application claims priority to U.S. provisional application, Ser. No. 60/998,104, filed on Oct. 9, 2007, which is hereby incorporated by reference in its entirety.

TECHNICAL FIELD

The invention relates to battery protection systems, and more particularly to battery cell balancing systems.

BACKGROUND

Used as a DC voltage power supply, a typical Lithium-Ion (Li-Ion) battery pack usually includes a group of battery cells connected in series.

Charging and discharging the battery pack through normal operation over time may result in cell-to-cell variations in cell voltages. When one or more cells in a series string charge faster or slower than the others, an unbalanced condition may occur.

Figure 1:
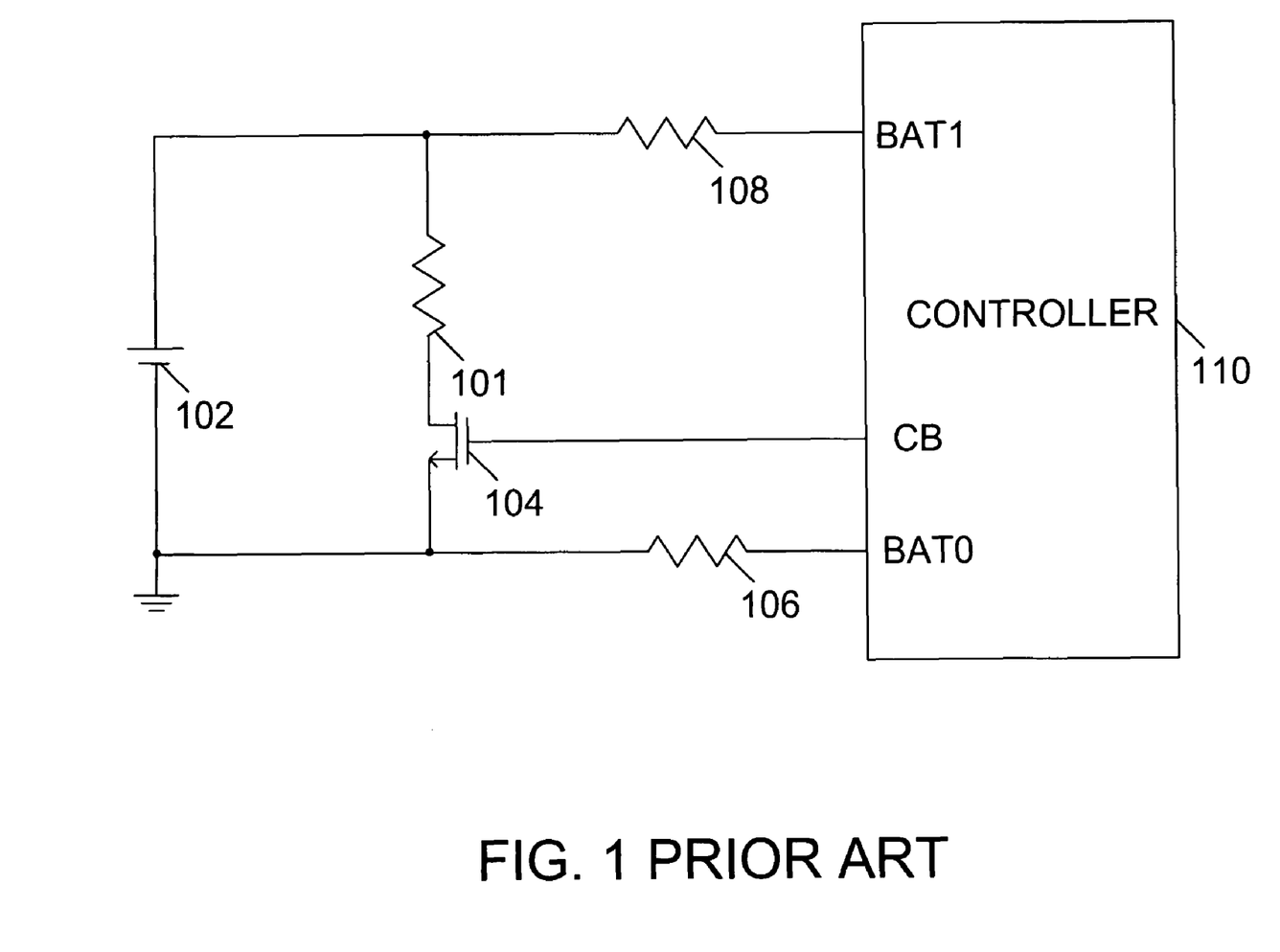
FIG. 1 illustrates a conventional cell balancing circuit using a dedicated pin to enable or disable a bypass path.

FIG. 1 illustrates a conventional cell balancing circuit using a dedicated pin to control an external bypass path. The positive terminal (anode) of a cell 102 is coupled to a controller 110 at terminal BAT1 through a first resistor 108. The negative terminal (cathode) of the cell 102 is coupled to the controller 110 at terminal BAT0 through a second resistor 106. An external bypass path is parallel-connected with the cell 102. The bypass path can include a current limiting resistor 101 and a bleeding control switch 104 connected in series with the current limiting resistor 101. The switch 104 is controlled by a controller 110 via a dedicated pin CB.

When an unbalanced condition occurs, for example, a voltage of cell 102 is greater than that of any other cell (not shown in FIG. 1 for purposes of brevity and clarity) in the battery pack, the controller 110 may turn on the switch 104 to enable a bleeding current to flow through the external bypass path, thereby balancing cell voltages in the battery pack. One of the disadvantages of this method is that an extra pin CB is needed to control the bleeding control switch 104, which can increase the cost.

Figure 2:
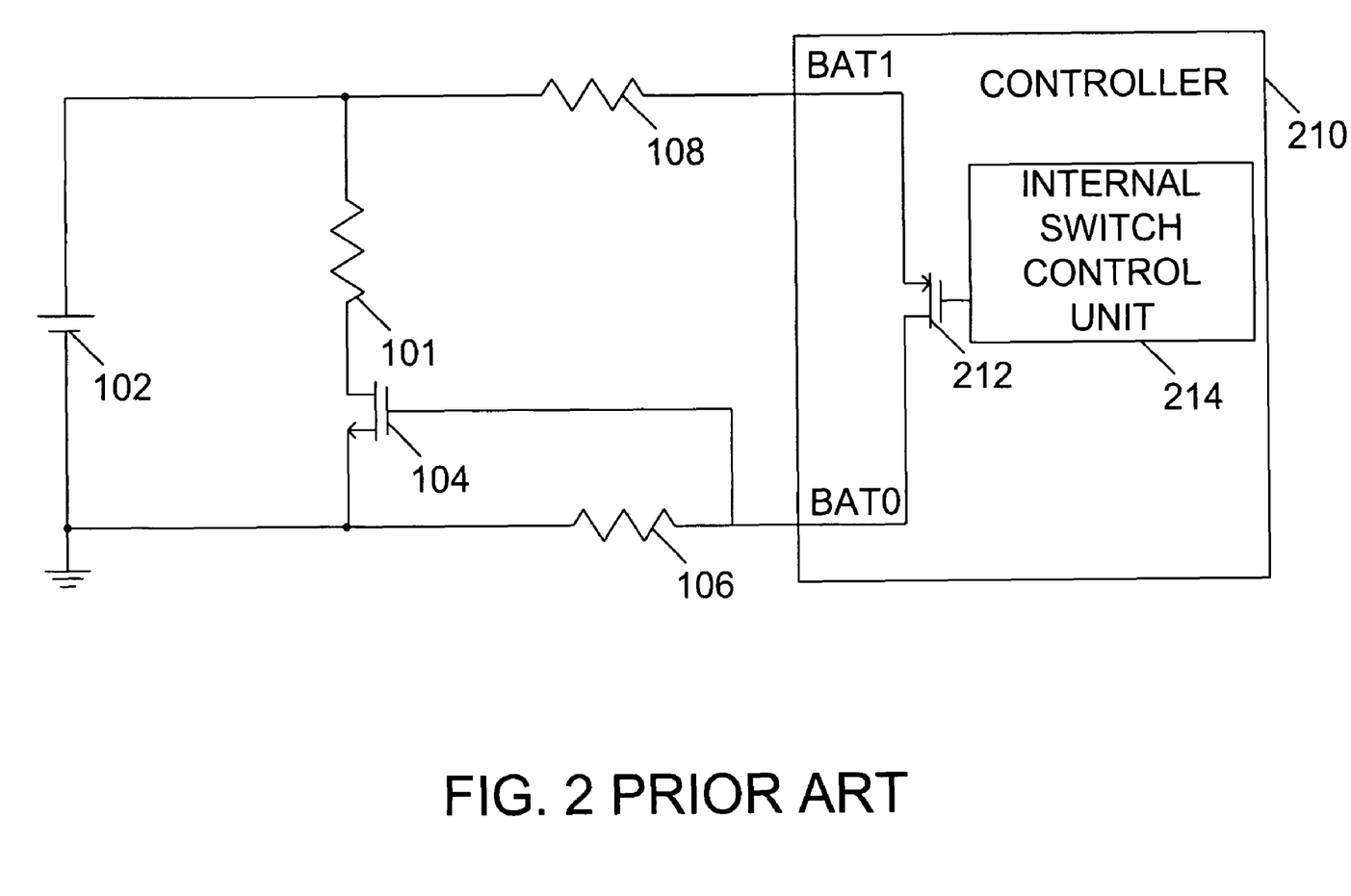
FIG. 2 illustrates another conventional cell balancing circuit with a bleeding control switch controlled by an internal switch.

FIG. 2 shows another conventional cell balancing circuit using an internal switch to control a bleeding control switch. Elements labeled the same as in FIG. 1 have similar functions and will not be repetitively described herein for purposes of brevity and clarity. In the controller 210, an internal switch 212 is coupled between terminal BAT1 and terminal BAT0, and is under control of an internal switch control unit 214 which is also located in the controller 210.

In FIG. 2, a voltage drop on the resistor 106 determines a conductance status of the bleeding control switch 104. Furthermore, when internal switch 212 is turned on by a control signal from the internal switch control unit 214, the voltage drop on the resistor 106 is determined by a voltage divider including resistor 108 and resistor 106. As such, the voltage drop on the resistor 106 may be small (e.g., half of the cell voltage).

There are also some disadvantages of this method. Firstly, since the voltage drop on the resistor 106 may be small, the threshold voltage of the bleeding control switch 104 may have to be low enough (e.g., 1V) such that the bleeding control switch 104 is able to be turned on by the small voltage drop across the resistor 106. If the bleeding control switch 104 is a MOSFET, then it may need to be a MOSFET with a lower threshold voltage. Such MOSFET is generally expensive, which will increase the total cost of the circuit.

Secondly, considering a group of series-connected cells, bleeding control switches of neighboring cells can not be simultaneously enabled, which leads to limited practical usage of the balancing circuit for a battery pack having a group of cells. In FIG. 2, in order to conduct the bypass path, internal switch 212 is turned on and a current flows from terminal BAT0, through the resistor 106 to the negative terminal of the cell 102. If there is a second cell (not shown in FIG. 2 for purposes of brevity and clarity) connected in series with cell 102, the resistor 106 is coupled between the positive terminal of the second cell and the controller 210. In order to conduct the bypass path of the second cell, a bleeding current needs to flow from a positive terminal of the second cell, through the resistor 106 to terminal BAT0, which may result in a confliction of the current direction.

Thirdly, the cell voltage may need to be high enough to ensure that the bleeding control switch 104 can be operable. If the cell voltage is too low, the gate-to-source voltage Vgs of the bleeding control switch 104 (that is, the voltage drop on the resistor 106) may never be greater than the threshold voltage of the bleeding control switch 104. As such, the switch 104 may not be turned on even if internal switch 212 is turned on. Consequently, this method may not be applicable for low voltage cells, such as LiFePo4 cells.

SUMMARY

According to one embodiment of the invention, there is provided a cell balancing circuit used for balancing a cell. The cell balancing circuit includes a bypass path coupled to the cell, a current regulator coupled to the bypass path, and a bleeding control switch. The current regulator is operable for producing a current and for controlling a conductance status of the bypass path. The bleeding control switch conducts the bypass path in response to the current produced by the current regulator.

BRIEF DESCRIPTION OF THE DRAWINGS

Features and advantages of embodiments of the invention will become apparent as the following detailed description proceeds, and upon reference to the drawings, where like numerals depict like elements, and in which.

DETAILED DESCRIPTION

Reference will now be made in detail to the embodiments of the present invention. While the invention will be described in conjunction with these embodiments, it will be understood that they are not intended to limit the invention to these embodiments. Additional advantages and aspects of the present disclosure will become readily apparent to those skilled in the art from the following detailed description. As will be described, the present disclosure is capable of modification in various obvious respects, all without departing from the spirit of the present disclosure. Accordingly, the drawings and description are to be regarded as illustrative in nature, and not as limitative.

Figure 3:
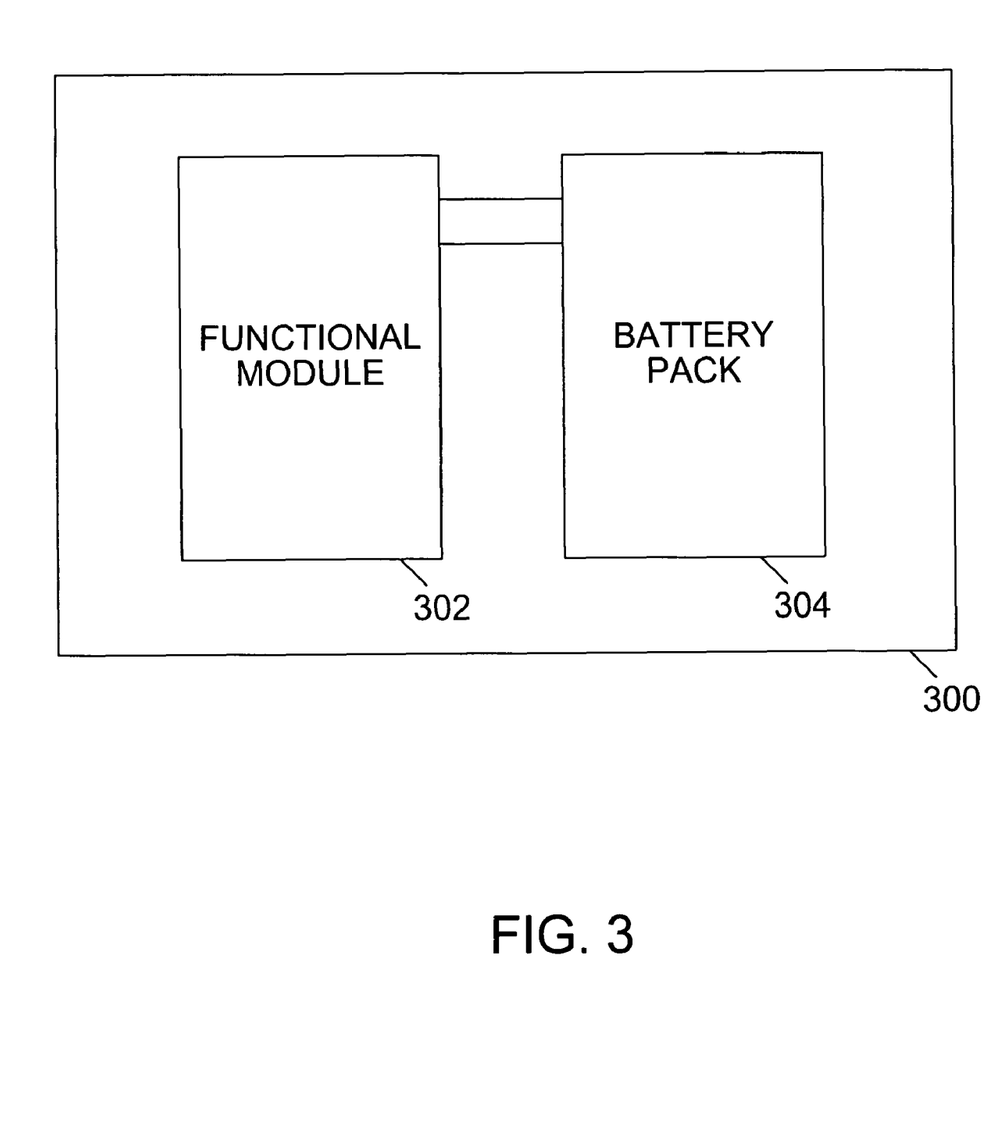
FIG. 3 illustrates an electrical system, in accordance with one embodiment of the present invention.

FIG. 3 illustrates an electrical system 300 including a functional module 302 and a battery pack 304. The battery pack 304 includes a group of battery cells. The functional module 302 is powered by the battery pack 304 and can perform one or more functions. The electrical system 300 can include, but is not limited to, a computer system, a vehicle, an electrical bike, an uninterruptible power supply, etc. In one embodiment, the functional module 302 includes a central processing unit (CPU) of a computer system. In one embodiment, the functional module 302 includes a vehicle motor of a vehicle.

According to the present invention, in one embodiment, it is provided a battery cell balancing circuit for the battery pack 304, which reduces pin numbers and can be operable even if a battery cell voltage is low. The cell balancing circuit uses a current regulator to control a bypass path of a battery cell, in one embodiment. Advantageously, a bleeding control switch for conducting a bypass path of a battery cell can be various types of switches and is not limited to a switch with a low threshold voltage (e.g., 1V). Furthermore, in one embodiment, the battery cell balancing circuit is able to balance multiple cells simultaneously, e.g., to balance neighboring cells simultaneously.

Figure 4:
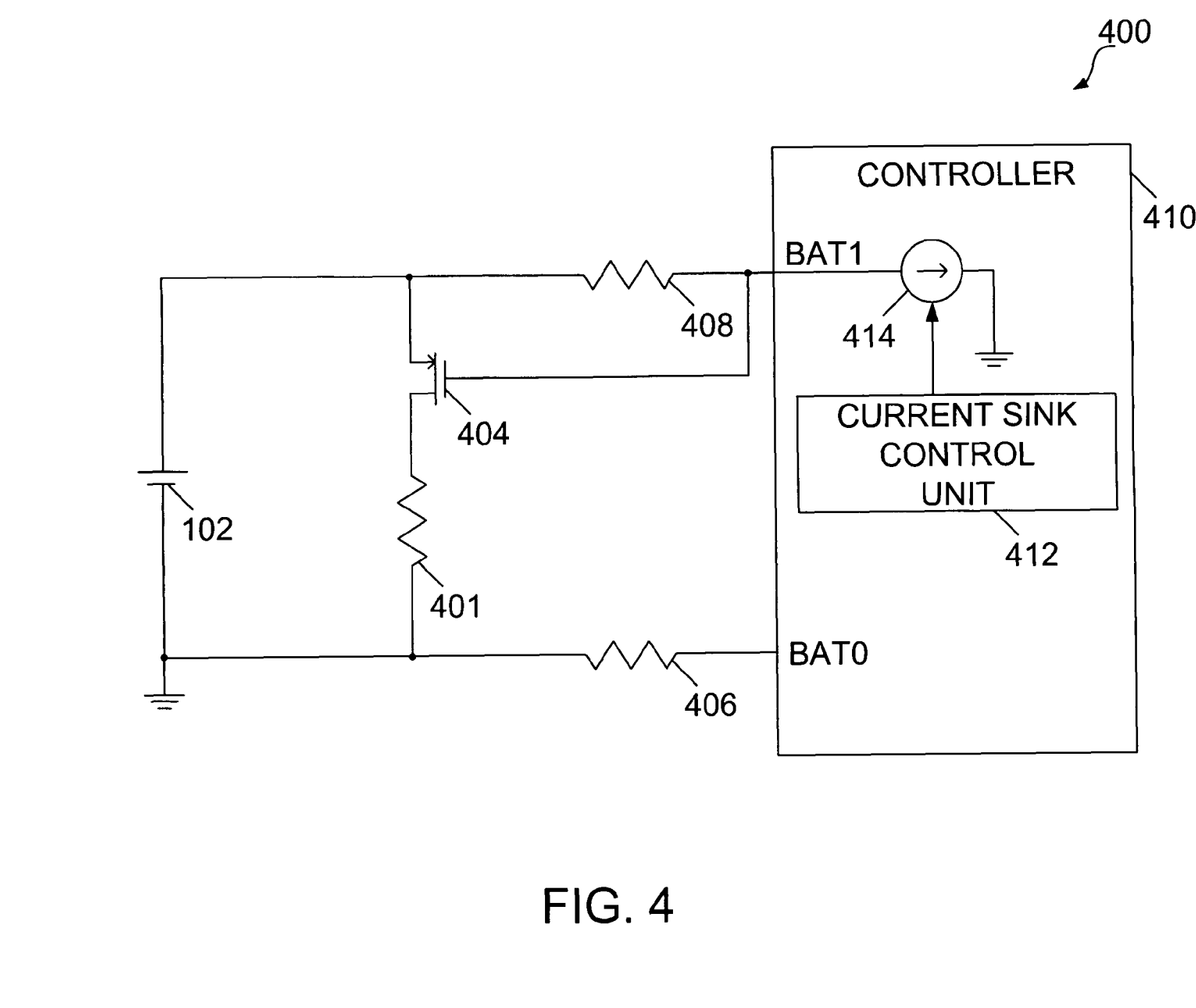
FIG. 4 illustrates a cell balancing circuit, in accordance with one embodiment of the present invention.

FIG. 4 illustrates a cell balancing circuit 400, in accordance with one embodiment of the present invention. The balancing circuit 400 in FIG. 4 utilizes a constant current regulator, e.g., an internal current sink 414, to control a conductance status of a bypass path of a cell 102, in one embodiment. In one embodiment, the current regulator 414 is coupled to the bypass path for producing a current to control a conductance status of the bypass path. The bypass path is conducted (turned on) in response to the current produced by the current regulator 414, in one embodiment.

The positive terminal (anode) of the cell 102 in a battery pack is coupled to a controller 410 at terminal BAT1 through a first resistor 408. The negative terminal (cathode) of the cell 102 is coupled to the controller 410 at terminal BAT0 through a second resistor 406. A bypass path is parallel-connected with the cell 102 for enabling a bypass current of the cell 102.

In one embodiment, the bypass path includes a bleeding (balancing) control switch 404 and a current limiting resistor 401 coupled in series. In one embodiment, the bleeding control switch 404 can be a P channel metal oxide semiconductor field effect transistor (PMOSFET). The bleeding control switch 404 can conduct the bypass path in response to the current produced by the current regulator 414. In one embodiment, the resistor 408 is coupled between the bypass path and the current sink 414. A conductance status of the bleeding control switch 404 is determined by its gate-to-source voltage Vgs, which is equal to a voltage drop on the resistor 408, in the example of FIG. 4. In one embodiment, a controller 410 can be used to control a charging and/or discharging of the battery pack, and can be used to perform protection functions (e.g., over-voltage protection, over-current protection, under-voltage protection, cell balancing) for the battery pack. The controller 410 can be integrated in the battery pack. The controller 410 can include a current regulator shown as a current sink 414 coupled between terminal BAT1 and ground. The current sink 414 is operable for providing a sink current flowing from the positive terminal of the cell 102 through the resistor 408 to ground and for controlling a conductance status of the bypass path. In other words, the current sink 414 sinks current from the positive terminal of the cell 102. The sink current flows though the resistor 408, thereby producing a voltage drop on the resistor 408. As such, the conductance status of the bypass path can be determined by the voltage drop across the resistor 408.

The controller 410 may further include a current sink control unit 412 which is operable for controlling (e.g., enable/disable) the current sink 414. In one embodiment, the current sink control unit 412 monitors the cell 102 and enables the current sink 414 if cell 102 is unbalanced. In one embodiment, cell 102 is unbalanced if a voltage of cell 102 is greater than a predetermined threshold. In an alternative embodiment, cell 102 is unbalanced if a difference between the voltage of cell 102 and a voltage of another cell (not shown in FIG. 4 for purposes of brevity and clarity) in the same battery pack is greater than a predetermined threshold. In an alternate embodiment, the bypass path of the cell 102 can be built inside the controller 410.

For illustration purposes, it is assumed that a resistance of the resistor 408 is 1KΩ, the sink current provided by the current sink 414 is 3 mA, and the threshold voltage of the bleeding control switch 404 is −1V. However, the cell balancing circuit in the present disclosure is not limited to such specific values.

In operation, if an unbalanced condition occurs (e.g., during a charging/discharging/standby phase of the battery pack), the current sink 414 can be enabled by the current sink control unit 412 to provide a sink current, e.g., 3 mA, flowing from the positive terminal of the cell 102 through the resistor 408 to ground. As such, the voltage drop on the resistor 408 is 3V. Therefore, the gate-to-source voltage Vgs of the bleeding control switch 404 is −3V and the bleeding control switch 404 is turned on, in one embodiment. Once the bleeding control switch 404 is turned on, the corresponding bypass path is conducted (turned on). As a result, a bleeding current (balancing current) can flow through the bypass path, thus balancing the cell voltages in the battery pack. For example, during a battery charging phase, if a bleeding current is enabled for the cell 102, part of the charging current of the cell 102 can be shunted away via the bypass path, thus charging of the cell 102 can be slowed down, and the cell unbalance can be reduced/eliminated after balancing for a time period. Such time period can be determined by the current sink control unit 412, in one embodiment.

Figure 5:
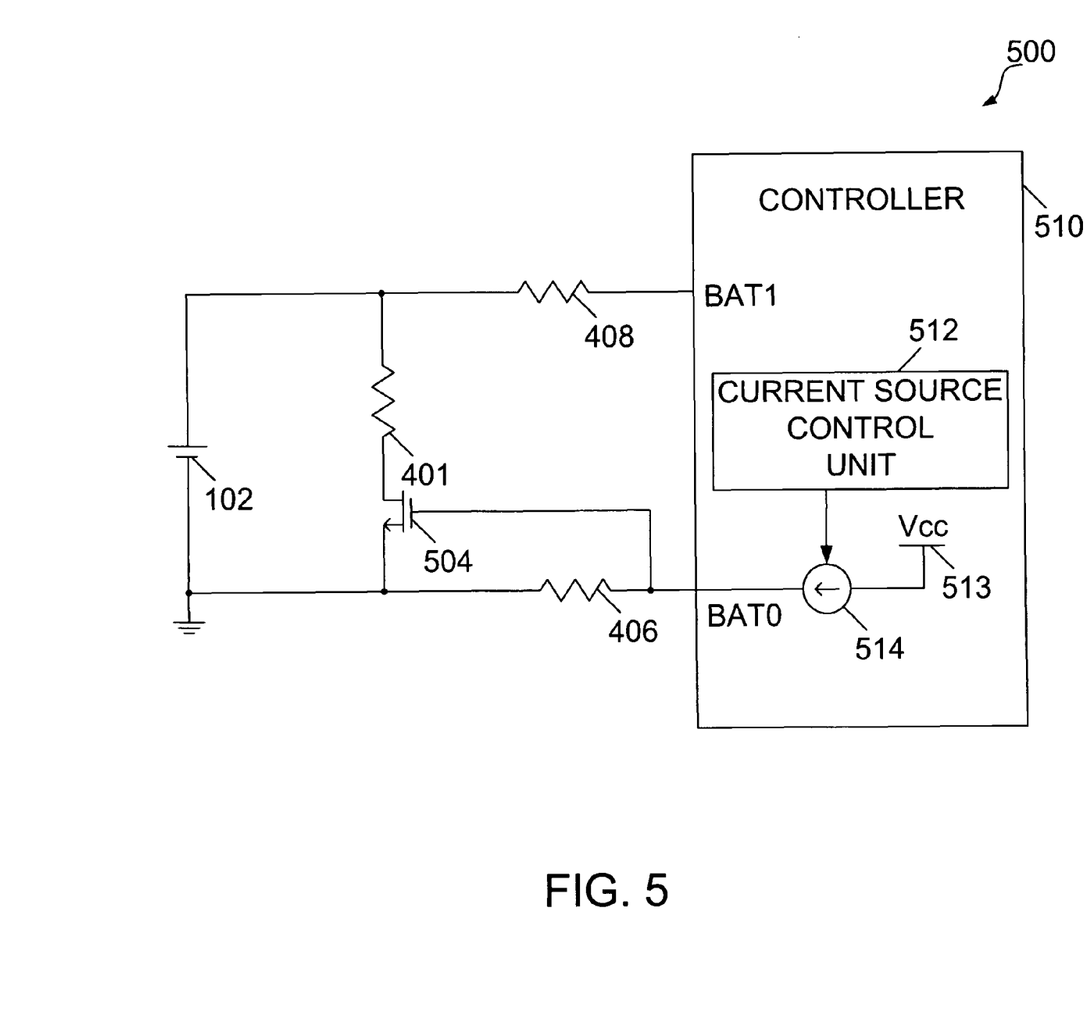
FIG. 5 illustrates a cell balancing circuit, in accordance with one embodiment of the present invention.

FIG. 5 illustrates a cell balancing circuit 500, in accordance with one embodiment of the present invention. Elements labeled the same as in FIG. 4 have similar functions and will not be detailed described herein for purposes of brevity and clarity. The balancing circuit 500 in FIG. 5 utilizes a constant current regulator, e.g., an internal current source 514 to control a conductance status of a bypass path of a cell 102 in a battery pack, in one embodiment. In one embodiment, the current regulator 514 is coupled to the bypass path for producing a current to control a conductance status of the bypass path. The bypass path is conducted (turned on) in response to the current produced by the current source 514, in one embodiment.

In one embodiment, a bleeding control switch 504 can be an N channel metal oxide semiconductor field effect transistor (NMOSFET). The bleeding control switch 504 can conduct the bypass path in response to the current produced by the current regulator 514. The positive terminal of the cell 102 is coupled to a controller 510 at terminal BAT1 through a first resistor 408. The negative terminal of the cell 102 is coupled to the controller 510 at terminal BAT0 through a second resistor 406. A conductance status of the bleeding control switch 504 is determined by its gate-to-source voltage Vgs, which is equal to a voltage drop on the resistor 406, in the example of FIG. 5. In one embodiment, the controller 510 can be used to control a charging and/or discharging of the battery pack, and can be used to perform protection functions (e.g., over-voltage protection, over-current protection, under-voltage protection, cell balancing) for the battery pack. The controller 510 can be integrated in the battery pack. In one embodiment, the controller 510 can include a current source 514 which is coupled between terminal BAT0 and a power supply Vcc 513. The current source 514 is operable for providing a source current flowing from the power supply 513 through the resistor 406 to the negative terminal of the cell 102 and for controlling a conductance status of the bypass path. In other words, the current source 514 sources current to the negative terminal of the cell 102. The source current flows through the resistor 406, thereby producing a voltage drop on the resistor 406. As such, the conductance status of the bypass path can be determined by the voltage drop across the resistor 406.

The controller 510 may further include a current source control unit 512 which is operable for controlling (e.g., enable/disable) the current source 514. In one embodiment, the current source control unit 512 monitors the cell 102 and enables the current source 514 if cell 102 is unbalanced. In one embodiment, cell 102 is unbalanced if a voltage of cell 102 is greater than a predetermined threshold. In an alternative embodiment, cell 102 is unbalanced if a difference between the voltage of cell 102 and a voltage of another cell (not shown in FIG. 5 for purposes of brevity and clarity) in the same battery pack is greater than a predetermined threshold. In an alternate embodiment, the bypass path of the cell 102 can be built inside the controller 510.

For illustration purposes, it is assumed that a resistance of resistor 406 is 1KΩ, the source current provided by the current source 514 is 3 mA, and the threshold voltage of the bleeding control switch 504 is 1V. However, the cell balancing circuit in the present disclosure is not limited to such specific values.

If an unbalanced condition occurs, the current source 514 can be enabled by the current source control unit 512 to provide a source current, e.g., 3 mA, flowing from the power supply 513 to the negative terminal of the cell 102 through the resistor 406. As such, the voltage drop across the resistor 406 is 3V. Therefore, the gate-to-source voltage Vgs of the bleeding control switch 504 is 3V and the bleeding control switch 504 is turned on, in one embodiment. Once the bleeding control switch 504 is turned on, the corresponding bypass path is conducted (turned on). Consequently, a bleeding current (balancing current) can flow through the bypass path, thus balancing the cell voltages in the battery pack. A bleeding time period can be determined by the current source control unit 512, in one embodiment.

Figure 6:
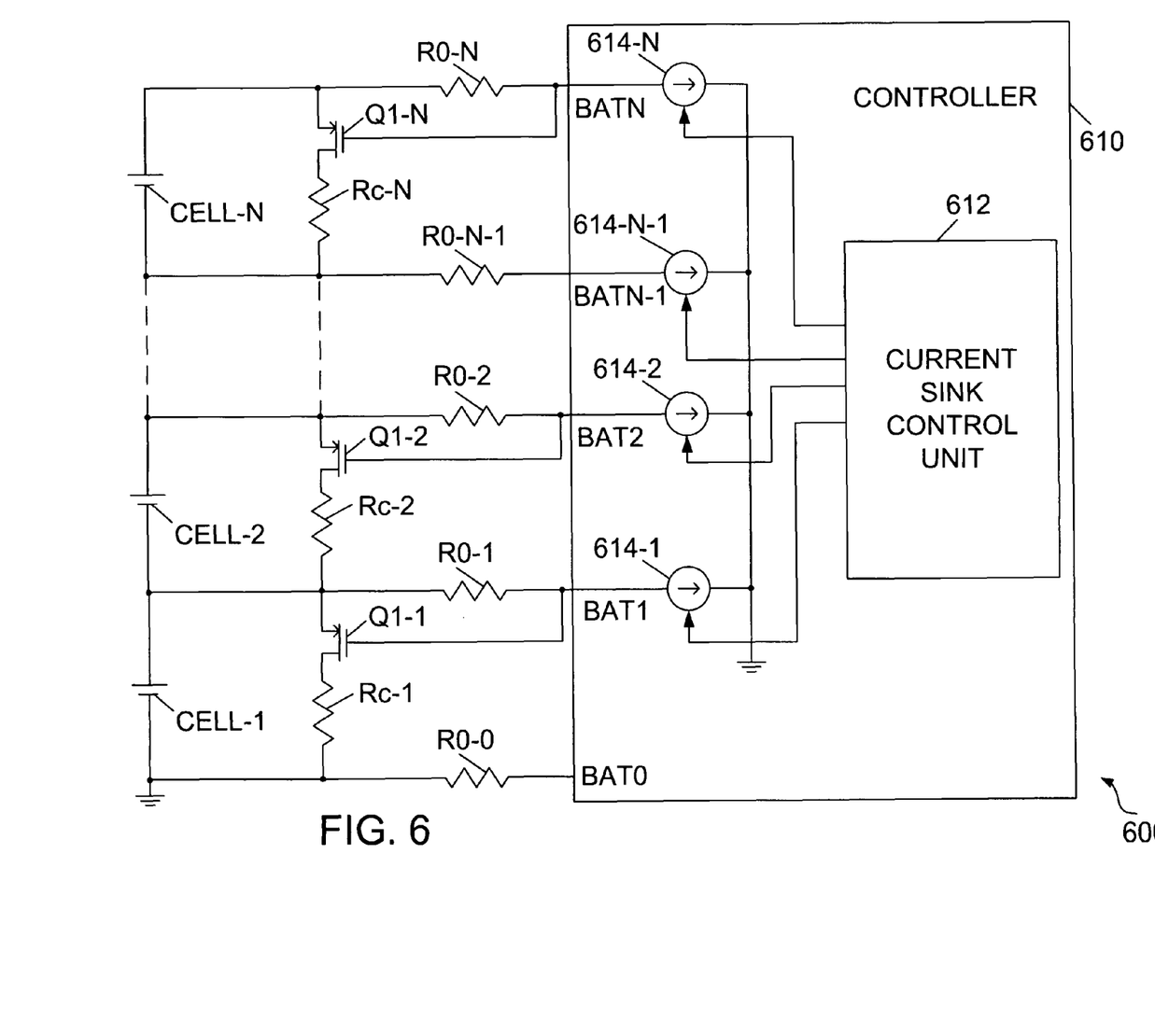
FIG. 6 illustrates a cell balancing circuit for balancing a group of cells, in accordance with one embodiment of the present invention.

FIG. 6 illustrates a cell balancing circuit for balancing a group of series-connected cells cell-1~cell-N in a battery pack, in accordance with one embodiment of the present invention. Cell-1~cell-N are coupled in series. Not all of the cells are shown in FIG. 6 for purposes of brevity and clarity. A plurality of bypass paths are coupled to the cells cell-1~cell-N respectively, and each of the plurality of bypass paths is operable for enabling a bypass current of a corresponding cell. In one embodiment, each bypass path can include a corresponding bleeding control switch Q1-1~Q1-N and a corresponding resistor Rc-1~Rc-N coupled in series. Therefore, a conductance status of a bypass path is determined by a conductance status of a corresponding bleeding control switch Q1-1~Q1-N. Each of the bleeding control switches Q1-1~Q1-N can be a PMOSFET. Not all of the bleeding control switches and resistors are shown in FIG. 6 for purposes of brevity and clarity.

A controller 610 is coupled to the plurality of cells cell-1~cell-N for balancing the plurality of cells cell-1~cell-N. The controller 610 comprises a plurality of current regulators, e.g., current sinks 614-1~614-N, which are coupled to the plurality of bypass paths respectively. Each of the plurality of current regulators 614-1~614-N is operable for producing a current flowing from a positive terminal of a corresponding cell to ground to control a conductance status of a corresponding bypass path, and the corresponding bypass path is conducted (turned on) in response to the current. Each bleeding control switch Q1-1~Q1-N can conduct (turn on) a corresponding bypass path in response to the current produced from a corresponding current regulator 614-1~614-N. Terminals of the cells cell-1~cell-N are coupled to the controller 610 at terminals BAT0~BATN through resistors R0-0~R0-N respectively. In one embodiment, terminals BAT1~BATN are coupled to ground through current sinks 614-1~614-N in the controller 610. Not all of the terminals, resistors, and current sinks are shown in FIG. 6 for purposes of brevity and clarity. In one embodiment, each of the plurality of current regulators 614-1~614-N is operable for producing a current flowing through a corresponding resistor R0-0~R0-N-1, which produces a voltage drop on the corresponding resistor R0-0~R0-N-1. The conductance status of a corresponding bleeding control switch Q1-1~Q1-N is determined by a voltage drop on the corresponding resistor R0-0~R0-N-1, in one embodiment.

In one embodiment, the controller 610 can include a current sink control unit 612 which is operable for controlling current sinks 614-1~614-N. In one embodiment, the current sink control unit 612 in the controller 610 enables a corresponding current sink 614-1~614-N if a corresponding cell cell-1~cell-N is unbalanced. The current sinks 614-1~614-N can be enabled or disabled independently or simultaneously by the current sink control unit 612. Consequently, the balancing circuit can be operable for balancing the group of cells according to the state of each cell.

Figure 7:
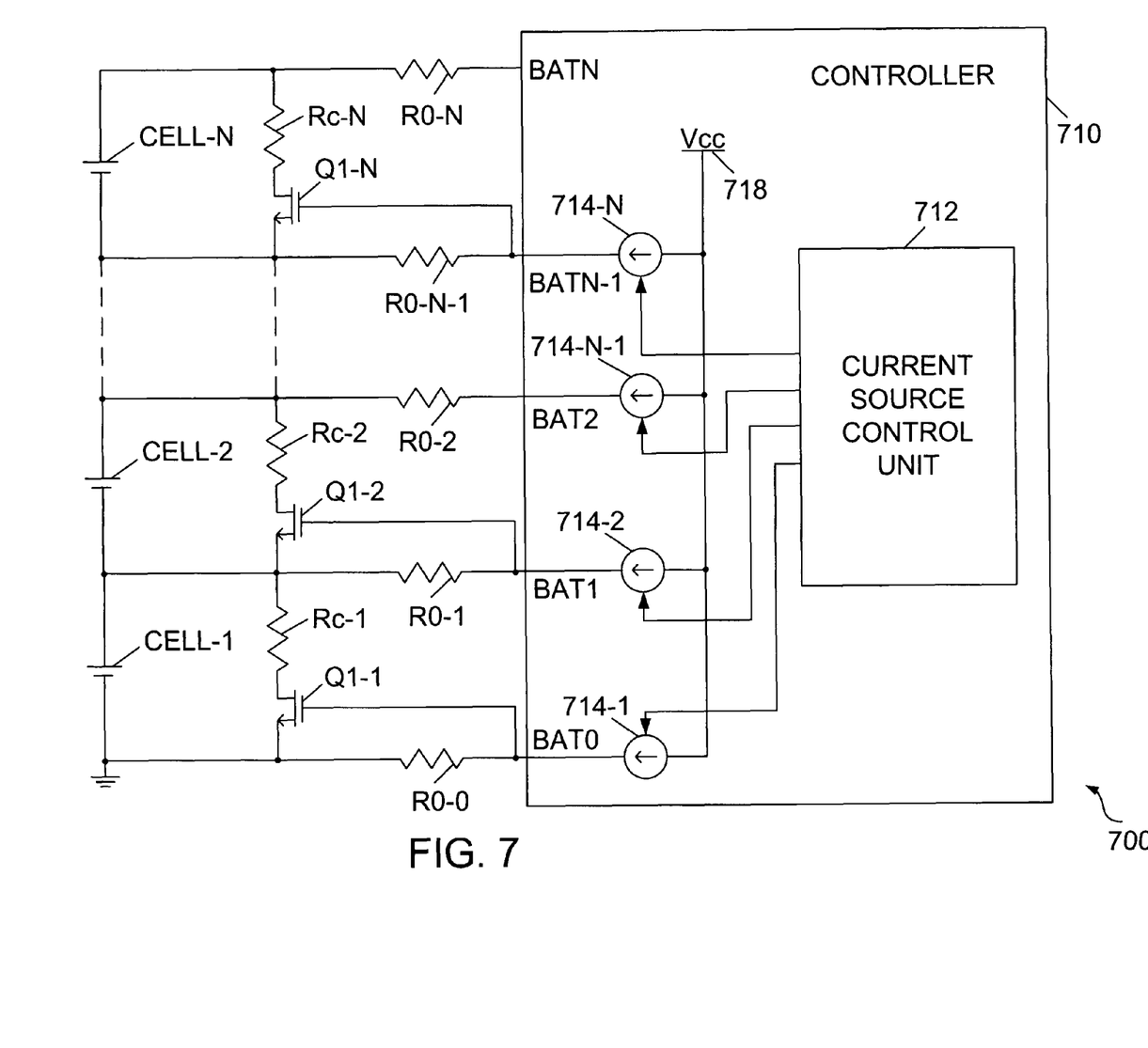
FIG. 7 illustrates a cell balancing circuit for balancing a group of cells, in accordance with one embodiment of the present invention.

FIG. 7 illustrates a cell balancing circuit for balancing a group of series-connected cells cell-1~cell-N in a battery pack, in accordance with one embodiment of the present invention. Cell-1~cell-N are coupled in series. Not all of the cells are shown in FIG. 7 for purposes of brevity and clarity. A plurality of bypass paths are coupled to the cells cell-1~cell-N respectively, and each of the plurality of bypass paths is operable for enabling a bypass current of a corresponding cell. In one embodiment, each bypass path can include a corresponding bleeding control switch Q1-1~Q1-N and a resistor Rc-1~Rc-N coupled in series. Therefore, a conductance status of a bypass path is determined by a conductance status of a corresponding bleeding control switch Q1-1~Q1-N. Each of the bleeding control switches Q1-1~Q1-N can be an NMOSFET. Not all of the bleeding control switches and resistors are shown in FIG. 7 for purposes of brevity and clarity.

A controller 710 is coupled to the plurality of cells cell-1~cell-N for balancing the plurality of cells cell-1~cell-N. The controller 710 comprises a plurality of current regulators, e.g., current sources 714-1~714-N, which are coupled to the plurality of bypass paths respectively. Each of the plurality of current regulators 714-1~714-N is operable for producing a current flowing from a power supply 718 to a negative terminal of a corresponding cell to control a conductance status of a corresponding bypass path, and the corresponding bypass path is conducted (turned on) in response to the current. Each bleeding control switch Q1-1~Q1-N can conduct (turn on) a corresponding bypass path in response to the current produced from a corresponding current regulator 714-1~714-N. Terminals of the cells cell-1~cell-N are coupled to the controller 710 at terminals BAT0~BATN through resistors R0-0~R0-N respectively. In one embodiment, terminals BAT0~BATN-1 are coupled to a power supply Vcc 718 through current sources 714-1~714-N in the controller 710. Not all of the terminals, resistors, and current sources are shown in FIG. 7 for purposes of brevity and clarity. In one embodiment, each of the plurality of current regulators 714-1~714-N is operable for producing a current flowing through a corresponding resistor R0-0 R0-N-1, which produces a voltage drop on the corresponding resistor R0-0 R0-N-1. The conductance status of a corresponding bleeding control switch Q1-1~Q1-N is determined by a voltage drop on the corresponding resistor R0-0~R0-N-1, in one embodiment.

In one embodiment, the controller 710 can include a current source control unit 712 which is operable for controlling current source 714-1~714-N. In one embodiment, the current source control unit 712 in the controller 710 enables a corresponding current source 714-1~714-N if a corresponding cell cell-1~cell-N is unbalanced. The current source 714-1~714-N can be enabled or disabled independently or simultaneously by the current source control unit 712. Consequently, the balancing circuit can be operable for balancing a group of cells according to the state of each cell.

Figure 8:
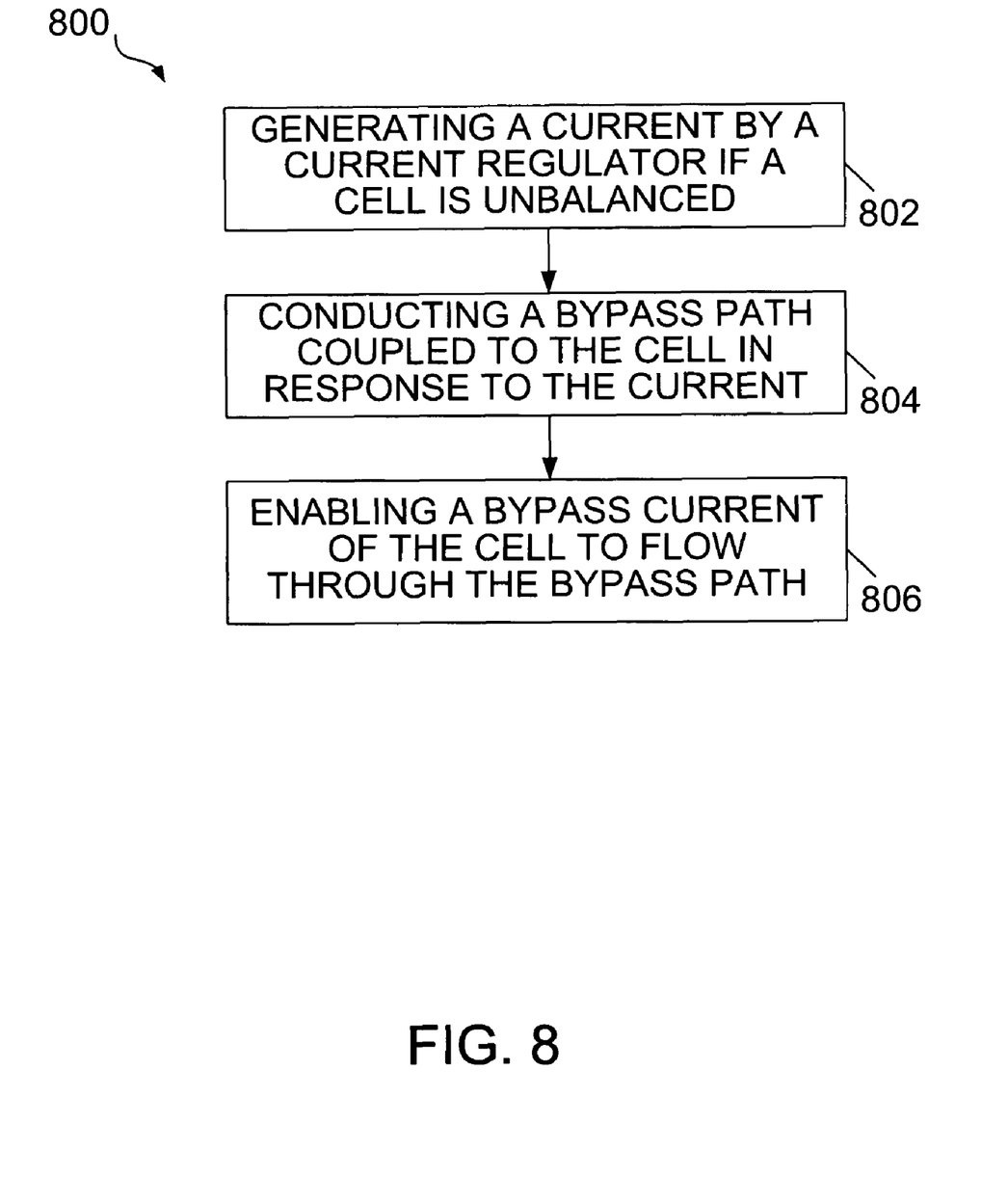
FIG. 8 illustrates a flowchart of a method to balance a cell, in accordance with one embodiment of the present invention.

FIG. 8 illustrates a flowchart 800 of a method for balancing a cell, in accordance with one embodiment of the present invention. FIG. 8 is described in combination with FIGS. 4 and 5. In block 802, a current is generated by a current regulator, e.g., a current sink 414 or a current source 514, if a cell 102 is unbalanced. As such, a voltage drop on a resistor 408/406 coupled between the bypass path and the current regulator can be produced (step not shown in FIG. 8). In one embodiment, a bleeding control switch 404/504 can be turned on in response to the voltage drop on the resistor 408/406 (step not shown in FIG. 8). Therefore, in block 804, a bypass path coupled to the cell 102 is conducted (turned on) in response to the current generated by the current regulator. In block 806, a bypass current is enabled to flow through the bypass path.

The PMOSFET and NMOSFET used in the above embodiments can be replaced by any other type of switches whose conductance status can be controlled by a voltage drop, without departing from the scope of the present disclosure. The resistor can also be replaced by any other type of components with resistance or impedance, across which a voltage drop can be developed due to a current flow, without departing from the scope of the present disclosure. The present invention intends to cover those equivalent embodiments.

Advantageously, according to the present invention, extra pins for controlling bypass paths are not needed, such that the cost can be reduced. Furthermore, cell balancing circuits in the present invention can be applicable for different types of battery cells, because a conductance status of a bleeding control switches is not affected by a cell voltage. In one embodiment, the present invention is further capable of simultaneously balancing neighboring cells. According to one embodiment of the present invention, a current regulator generates currents with the same direction either flow into the controller (when current sinks are used as shown in FIG. 6) or flow out of the controller (when current sources are used as shown in FIG. 7). Therefore, there is no confliction of current direction. Consequently, multiple cells, no matter neighboring cells or non-neighboring cells, can be simultaneously balanced by a single controller, in one embodiment. The cell balancing circuits can be used in battery charging and battery discharging, stand-by conditions, in one embodiment.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A cell balancing circuit comprising:
a bypass path coupled to a cell for enabling a bypass current of said cell;
a current regulator coupled to said bypass path for producing a current having a predetermined current level to control a conductance status of said bypass path;
a bleeding control switch in said bypass path for conducting said bypass path in response to said current, said bleeding control switch has a first terminal and a second terminal; and
a resistor coupled between said bypass path and said current regulator,
wherein said current flows through said resistor to produce a voltage drop on said resistor, wherein a voltage difference between said first terminal and said second terminal of said bleeding control switch is equal to said voltage drop on said resistor, and wherein a conductance status of said bleeding control switch is determined by said voltage difference.

2. The cell balancing circuit of claim 1, wherein said current regulator comprises a current source operable for producing said current flowing from a power supply to a negative terminal of said cell.

3. The cell balancing circuit of claim 1, wherein said current regulator comprises a current sink operable for producing said current flowing from a positive terminal of said cell to ground.

4. The cell balancing circuit of claim 1, further comprising:
a current regulator control unit coupled to said current regulator for controlling said current regulator and for enabling said current regulator if said cell is unbalanced.

5. The cell balancing circuit of claim 4, wherein said cell is unbalanced if a voltage difference between a first cell voltage of said cell and a second cell voltage of another cell in series with said first cell is greater than a predetermined threshold.

6. The cell balancing circuit of claim 4, wherein said cell is unbalanced if a first cell voltage of said cell is greater than a predetermined threshold.

7. A battery pack having at least a first cell and a second cell adjacent to said first cell, comprising:
a first bypass path coupled to said first cell for enabling a bypass current of said first cell;
a second bypass path coupled to said second cell for enabling a bypass current of said second cell;
a controller coupled to said first cell and said second cell for balancing said first cell and said second cell, said controller comprising a first current regulator coupled to said first bypass path for producing a first current to control a conductance status of said first bypass path and comprising a second current regulator coupled to said second bypass path for producing a second current to control a conductance status of said second bypass path;

a first bleeding control switch in said first bypass path for conducting said first bypass path in response to said first current, said first bleeding control switch has a first terminal and a second terminal;

a second bleeding control switch in said first bypass path for conducting said second bypass path in response to said second current; and a resistor coupled between said first bypass path and said first current regulator, wherein said first current flows through said resistor to produce a voltage drop on said resistor, wherein a voltage difference between said first terminal and said second terminal of said first bleeding control switch is equal to said voltage drop on said resistor, wherein said conductance status of said first bleeding control switch is determined by said voltage difference, wherein said controller is operable for enabling said first current regulator and said second current regulator simultaneously.

8. The battery pack of claim 7, wherein said first current regulator comprises a current sink operable for producing said first current flowing from a positive terminal of said first cell to ground.

9. The battery pack of claim 7, wherein said first current regulator comprises a current source operable for producing said first current flowing from a power supply to a negative terminal of said first cell.

10. The battery pack of claim 7, wherein said controller enables said first current regulator if said first cell is unbalanced.

11. The battery pack of claim 10, wherein said first cell is unbalanced if a voltage difference between a first cell voltage of said first cell and a second cell voltage of another cell is greater than a predetermined threshold.

12. The battery pack of claim 10, wherein said first cell is unbalanced if a first cell voltage of said first cell is greater than a predetermined threshold.

13. A method for balancing a plurality of cells, said method comprising:

generating a first current having a predetermined current level by a first current regulator;

enabling said first current to flow through a resistor coupled between said first current regulator and a first bypass path corresponding to a first cell of said cells to produce a voltage drop on said resistor;

turning on a bleeding control switch in said first bypass path in response to said voltage drop to conduct said first bypass path, wherein a conductance status of said bleeding control switch is determined by a voltage difference between a first terminal of said bleeding control switch and a second terminal of said bleeding control switch, and wherein said voltage difference is equal to said voltage drop on said resistor; and enabling a bypass current of said first cell to flow through said first bypass path.

14. An electronic system comprising:
a functional module for performing a function; and
a battery pack for powering said functional module, wherein said battery pack comprises:
a plurality of cells comprising a first cell and a second cell adjacent to said first cell;
a first bypass path coupled to said first cell for enabling a bypass current of said first cell;

a second bypass path coupled to said second cell for enabling a bypass current of said second cell;

a controller coupled to said first cell and said second cell for balancing said first cell and said second cell, said controller comprising a first current regulator coupled to said first bypass path for producing a first current to control a conductance status of said first bypass path and comprising a second current regulator coupled to said second bypass path for producing a second current to control a conductance status of said second bypass path;

a first bleeding control switch in said first bypass path for conducting said first bypass path in response to said first current, said first bleeding control switch has a first terminal and a second terminal;

a second bleeding control switch in said first bypass path for conducting said second bypass path in response to said second current; and a resistor coupled between said first bypass path and said first current regulator, wherein said first current flows through said resistor to produce a voltage drop on said resistor, wherein a voltage difference between said first terminal and said second terminal of said first bleeding control switch is equal to said voltage drop on said resistor, and wherein said conductance status of said first bleeding control switch is determined by said voltage difference, wherein said controller is operable for enabling said first current regulator and said second current regulator simultaneously.

15. The electronic system of claim 14, wherein said first current regulator comprises a current sink operable for producing said first current, and wherein said first current flows from a positive terminal of said first cell to ground.

16. The electronic system of claim 14, wherein said first current regulator comprises a current source operable for producing said first current, and wherein said first current flows from a power supply to a negative terminal of said first cell.

17. The electronic system of claim 14, wherein said controller enables said first current regulator if said first cell is unbalanced.

18. The electronic system of claim 17, wherein said first cell is unbalanced if a voltage difference between a first cell voltage of said first cell and a second cell voltage of another cell is greater than a predetermined threshold.

19. The electronic system of claim 17, wherein said first cell is unbalanced if a first cell voltage of said first cell is greater than a predetermined threshold.

20. The electronic system of claim 14, wherein said functional module comprises a central processing unit (CPU).

21. The electronic system of claim 14, wherein said functional module comprises a vehicle motor.

22. The method of claim 13, further comprising:
generating a second current having said predetermined current level by a second current regulator;
conducting a second bypass path coupled to a second cell of said cells in response to said second current; and
enabling said first current regulator and said second current regulator simultaneously,
wherein said second cell is adjacent to said first cell.

* * * * *